United States Patent [19]

Gamble

[11] Patent Number: 5,592,629
[45] Date of Patent: Jan. 7, 1997

[54] APPARATUS AND METHOD FOR MATCHING DATA RATES TO TRANSFER DATA BETWEEN TWO ASYNCHRONOUS DEVICES

[75] Inventor: William H. Gamble, Colorado Springs, Colo.

[73] Assignees: AT&T Global Information Solutions Company, Dayton, Ohio; Hyundai Electronics America, San Jose, Calif.; Symbios Logic Inc., Fort Collins, Colo.

[21] Appl. No.: 997,426

[22] Filed: Dec. 28, 1992

[51] Int. Cl.$^6$ .................................................. G06F 13/42
[52] U.S. Cl. ..................................................... 395/250
[58] Field of Search ................ 364/DIG. 1 MS File, 364/DIG. 2 MS File; 395/200, 250, 500, 800; 360/77.02, 77.05, 77.08, 75

[56] References Cited

U.S. PATENT DOCUMENTS 4,716,525  12/1987  Gilanyi et al. ........................ 364/200
4,965,801  10/1990  Dulac .................................... 371/40.1
5,255,136  10/1993  Machado et al. .................... 360/77.02

Primary Examiner—Robert B. Harrell
Attorney, Agent, or Firm—David K. Lucente; Wayne P. Bailey

[57] ABSTRACT

A method and apparatus for transferring data between two relatively asynchronous devices and yet matching the maximum data rate of each. Both an asynchronous FIFO and a synchronous FIFO are used to match the data rate of a high speed asynchronous device, such as a SCSI/SCSI2 controller, to a high speed synchronous device, such as a DMA controller. A high speed synchronizer controls both FIFOs such that the asynchronous and the synchronous devices can each run at its maximum data transfer rate during operation.

19 Claims, 4 Drawing Sheets

APPARATUS AND METHOD FOR MATCHING DATA RATES TO TRANSFER DATA BETWEEN TWO ASYNCHRONOUS DEVICES

BACKGROUND OF THE INVENTION

The present invention relates to a computer system, and more particularly to a method and apparatus for controlling data transfers between two interfaces of a computer system that have different data rates.

Often a computer system receives data from a source that is not synchronized to the local clock used by the computer system, for example peripheral buses often are not synchronized to the local system clock. Such a bus may be synchronized with respect to itself, yet its data may not have any simple relationship with the local system clock. Therefore, it is considered asynchronous with respect to the local system clock. Further, the asynchronous data transferred may be in random bursts or it may be at a rate that is not a simple multiple or fraction of the local system clock rate. Thus the computer system has the task of storing received data until it can be processed, which in this case includes matching data transfer rates between different parts of the computer system.

A known way to store data received from an asynchronous source is to receive the data into a first-in, first-out (FIFO) buffer memory circuit 200 as shown in FIG. 1. FIFO circuit 200 has a FIFO 202 which usually is an asynchronous type, referred to sometimes as a fall through type of FIFO. FIFO 202 can receive data from or transmit data to an interface 203 of one asynchronous device over data bus 204. Coordination of the asynchronous data transfer is accomplished by control signal transferred across control bus 206 to interface control logic 208. FIFO status signals regarding data transferred between the interface 203 and the FIFO 202 are transferred to interface control logic 208 by bus 209. Similarly, FIFO 202 can transmit data to or receive data from an interface 211 of a second device over data bus 210. Coordination of the data transferred between the interface 211 of the second device and the FIFO 202 is accomplished by control signals transferred across bus 212 to interface control logic 214. FIFO status signals regarding data transferred between the second device and the FIFO 202 are transferred to interface control logic 214 by bus 215.

If interface 203 is asynchronous with respect to the local clock, the FIFO 202 is a fall-through type, and control logic of interface 211 is implemented with synchronous logic, then the status signals from the FIFO 202 must be synchronized before being transmitted to the control logic of interface 211. Fall-through FIFOs tend to be layout sensitive, which means for high performance the layout must be carefully iterated and tested. Further, a fall-through FIFO introduces a data latency from the time the data is written to the FIFO 202 to the time that the data can be read from the FIFO 202. This data latency can be reduced by using high speed logic components, but it can never be eliminated.

If interface 203 is asynchronous with respect to the local clock, the FIFO 202 is a fall-through type, and control logic of interface 211 is implemented with asynchronous logic, then the interface signals from the FIFO 202 must be synchronized to the local clock from bus 212 before being transmitted. Such synchronization is necessary because data can be transferred between interface 203 and FIFO 202 at any time since it is controlled by a different clock. The time required for synchronization of status or interface signals could prevent interface 211 from operating at its full data rate. Additionally, since FIFO 202 is a fall-through type, it has the layout sensitivity and the latency problems mentioned above.

If the FIFO 202 is synchronous to the local clock, interface 203 is synchronous to its own local clock, then the data and status signals from interface 203 must be synchronized to the same clock signals that the FIFO 202 is synchronized with. A synchronous FIFO implementation tends not to be layout sensitive, so chip development time is reduced. The read latency of a synchronous FIFO is only one clock period instead of the component dependent 0+ to 2 clock periods of fall-through FIFOs. However, the synchronous implementation of the FIFO 202 in the circuit 200 inherently introduces a two clock period synchronization delay which can prevent interface 203 from operating at its full data rate.

In view of the limitations of the known FIFO circuit, it is an object of the present invention to provide a FIFO circuit that is interposed between two interfaces that are asynchronous with respect to each other and matches the full operating data rate of each.

It is another object of the present invention to provide a method for matching data rates of two interfaces that are asynchronous with respect to each other.

SUMMARY OF THE INVENTION

Briefly stated, in accordance with one aspect of the invention the foregoing objects are achieved by providing a circuit for matching data rates to transfer data between two devices that are relatively asynchronous. The data rate matching circuit includes an asynchronous FIFO that has an input and an output; a synchronizer, that has an input and an output, with the synchronizer input connected to the asynchronous FIFO output; and a synchronous FIFO, that has an input and an output, with the synchronous FIFO input connected to the synchronizer output. Asynchronous data signals that are inputted on the asynchronous FIFO input from one of the asynchronous devices are outputted to the other of the asynchronous devices after a delay at the synchronous FIFO output.

BRIEF DESCRIPTION OF THE DRAWINGS

While the specification concludes with the appended claims particularly pointing out and distinctly claiming the subject matter which is regarded as the invention, it is believed that the invention will be better understood from the following description taken in conjunction with the accompanying drawings in which:

DETAILED DESCRIPTION

Figure 2:
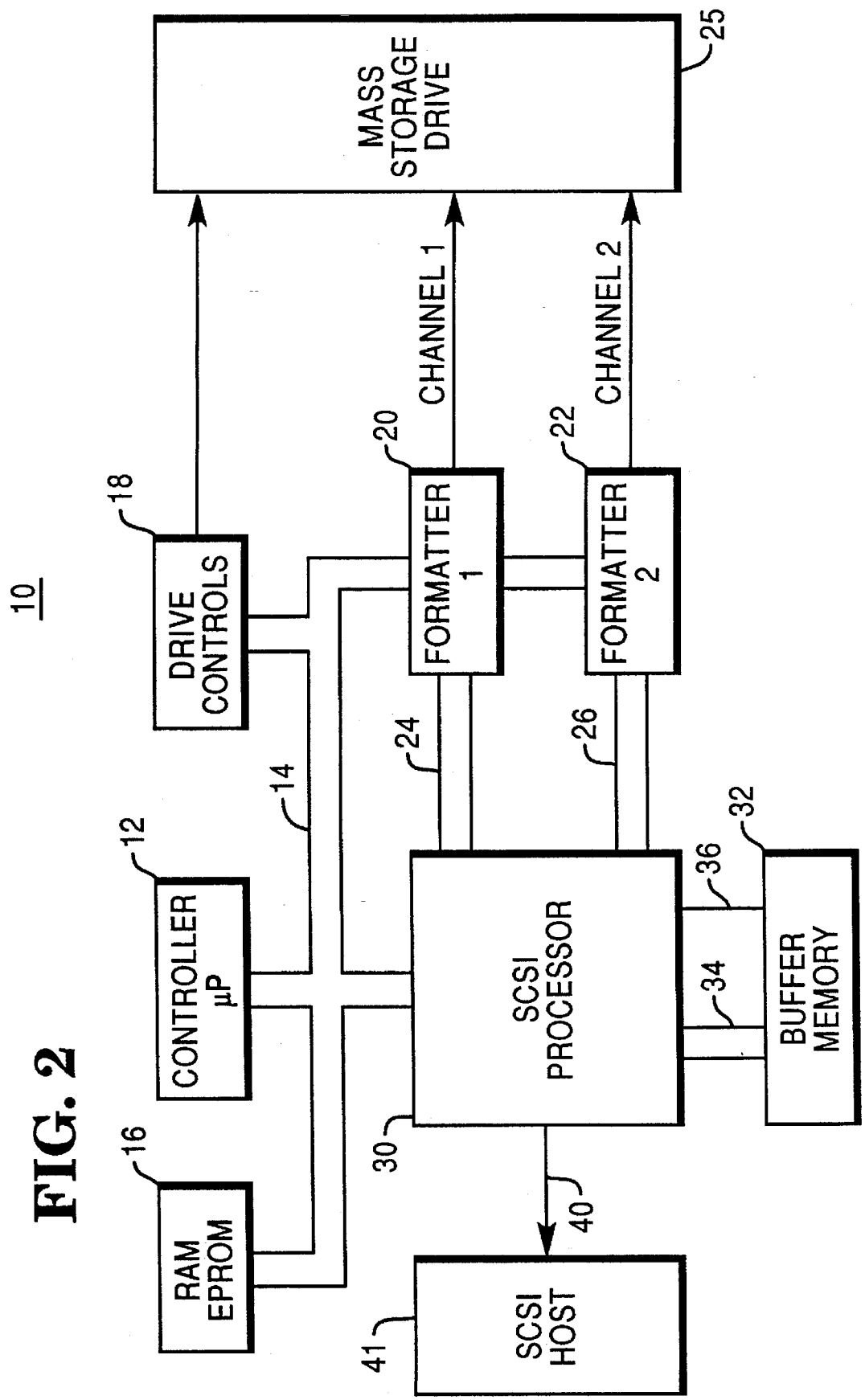
FIG. 2 is a block diagram of a computer system that has a data rate matching circuit according to the present invention.

Referring now to FIG. 2, a computer system 10 is shown. Computer system 10 has a microprocessor 12 connected to a system bus 14. System bus 14 is also connected to main memory 16 which contains random access memory (RAM), and may contain read only memory (ROM) as well. System bus 14 is additionally connected to drive controller 18, formatter 20 and formatter 22. Drive controller 18 and formatters 20, 22 are connected to a data drive 25, which is a mass storage device. Further, the system bus 14 is connected to a SCSI processor 30. The SCSI processor 30 is connected to a buffer memory 32 by address-and-data bus 34 and control bus 36. Also, SCSI processor 30 is connected to formatters 20, 22 by buses 24, 26 respectively. Further, SCSI processor 30 is connected to a SCSI host 41 by a SCSI2 bus 40. Connected in this manner, SCSI controller 30 can transfer data between the high speed SCSI2 bus 40 and the data drive 25 using the drive controller 18 to provide the mechanics of locating the data on the disk storage media (not shown) and one or both of the formatters 20, 22 to format the transferred data appropriately for either the storage media if the operation is a write to disk, or for the buffer memory 32 with error correction code operation (ECC) if the operation is a read from the storage media.

Figure 1:
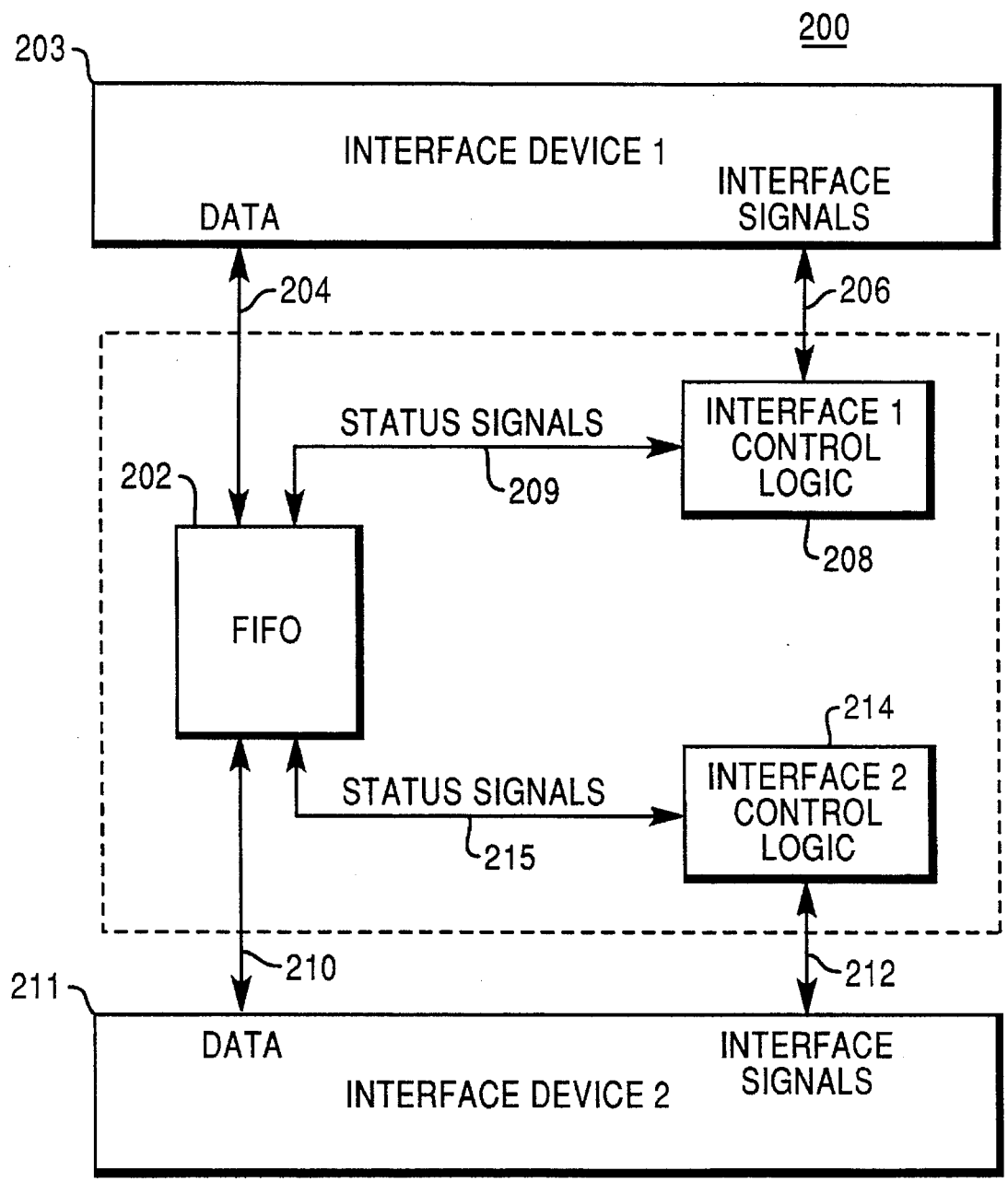
FIG. 1 is a block diagram of a known FIFO circuit used for transferring data between two interfaces that are relatively asynchronous.
Figure 3:
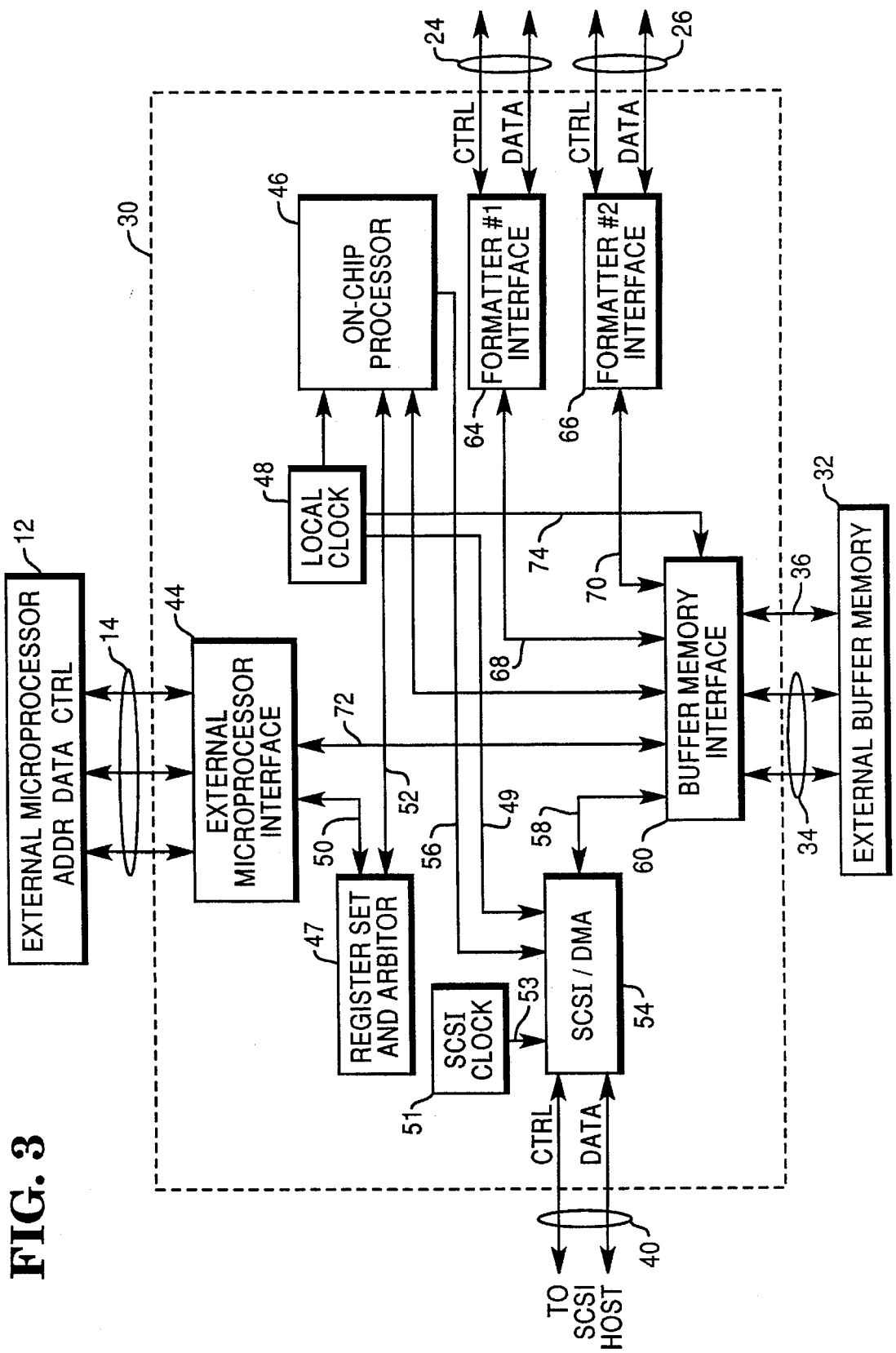
FIG. 3 is a block diagram of a SCSI processor of the computer system shown in FIG. 2.

Referring now to FIG. 3, further details of the SCSI processor 30 are shown. SCSI processor 30 has an external microprocessor interface 44 which is connected to address lines, data lines and control lines of system bus 14. By external microprocessor interface 44, the microprocessor 12 (shown in FIG. 1) can transfer data to and from addresses that are assigned to the SCSI processor 30.

As its name implies, the SCSI processor 30 has a SCSI-DMA controller 54 as a part thereof. SCSI-DMA controller 54 is connected to the SCSI2 bus 40 for receiving and transmitting data with the SCSI host 41 (not shown in FIG. 3). SCSI-DMA controller 54 has a SCSI2 interface which performs all of the SCSI protocol at the hardware link level. This SCSI2 interface can be a standard cell, such as a sixteen bit wide data path version of the 53C80 cell available from Microelectronics Division of NCR Corporation of Dayton, Ohio. SCSI2-DMA controller 54 is connected to a local clock 48 by line 49 to provide timing information. SCSI2-DMA controller 54 is also connected to a SCSI local clock 51 by line 53. SCSI2-DMA controller 54 is also connected to on-chip processor 46 by bus 56. The on-chip processor 46 provides control of the SCSI2 interface that the interface cannot provide for itself for data transfers with the SCSI2 bus 40.

SCSI2-DMA controller 54 also includes a DMA controller that is especially helpful for transferring blocks of data to or from the SCSI2 bus 40. The DMA controller logically is located between the SCSI2 interface and a buffer memory interface 60 that it is lo connected by bus 58. The buffer interface 60 is connected to external buffer memory 32 by buses 34 and 36. Through bus 58, buffer memory 60 and buses 34, 36; DMA controller portion of the SCSI2-DMA controller 54 can access external buffer memory 32 in order to temporarily store data received from the SCSI interface over SCSI2 bus 40, or to retrieve data that has been stored there to be transmitted to the SCSI interface over the SCSI2 bus 40.

Figure 4:
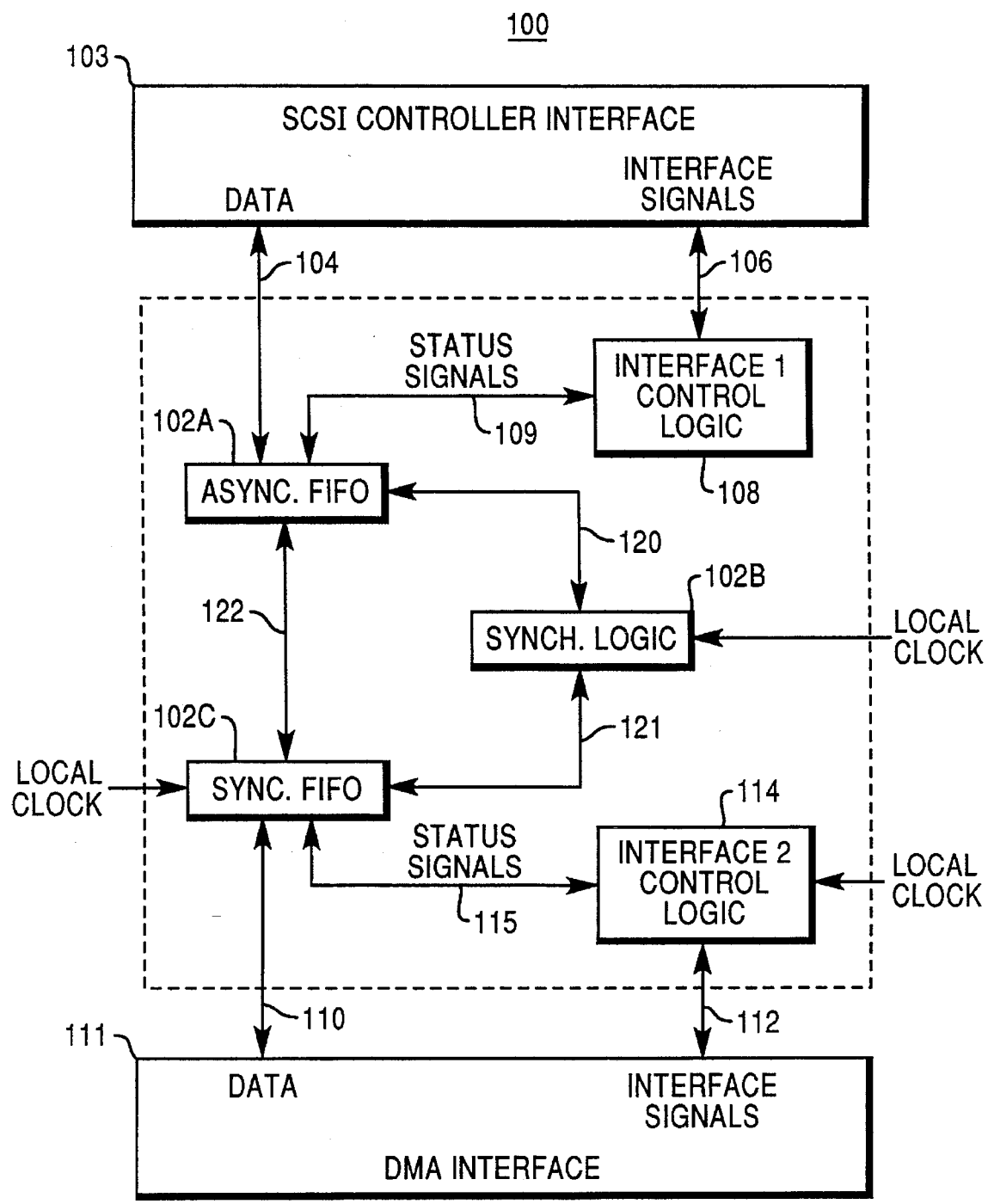
FIG. 4 is a data rate matching FIFO circuit, according to one embodiment of the invention, that is part of the SCSI processor shown in FIG. 3.

Referring now to FIG. 4, further details of the SCSI-DMA controller 54 will be described. SCSI-DMA controller 54 has a SCSI interface 103, which as mentioned above may be a standard SCSI/SCSI2 controller standard cell. SCSI interface 103 operates in either the synchronous SCSI mode, which means that a number of data words may be received from or transmitted to the SCSI bus 40 (shown in FIG. 3), or in asynchronous mode, which means that each word is transferred in response to a request and thus such transfers are completely asynchronous with respect to the local clock 48 (not shown in FIG. 4). It will be appreciated that even the synchronous mode of the SCSI2 bus will be relatively asynchronous relationship to the local clock 48, and therefore the data signals on data bus 104 and the control signals on bus 106 will be relatively asynchronous.

Buses 104 and 106 connect the SCSI controller interface 103 to a data rate matching FIFO circuit 100. The status and control bus 106 connects to interface 1 control logic 108 of the data rate matching FIFO circuit 100. Data bus 104 is connected to asynchronous FIFO 102A of the data rate matching FIFO circuit 100. Buses 104, 106, asynchronous FIFO 102A and interface 1 control logic 108 are bi-directional, but since the asynchronous receipt of data on bus 104 is the most difficult task most of the following description will focus on the receiving function because once the receiving operation is explained, one skilled in the art will appreciate how to reverse the operation and transmit with the data rate matching circuit 100.

The asynchronous status and control signals transferred on bus 106 between SCSI controller interface 103 and interface 1 control logic in receive mode are used to control the receipt of asynchronous data signals transferred on bus 104 into asynchronous FIFO 102A. Asynchronous FIFO 102A is a three stage fall-through FIFO that functions as a time and rate buffer for data received from the SCSI controller interface 103. The three fall-through stages allow SCSI controller interface 103 to transmit data words into asynchronous FIFO 102A as fast as they are received on SCSI bus 40 (shown in FIG. 3).

Asynchronous FIFO 102A is connected to synchronizer logic 102B by bus 120. In receive mode, which is a little more difficult than transmit mode, when a data word has fallen through FIFO 102A and resides in the bottom location a flag is set. Synchronizer logic 102B receives each flag when set and transfers each data word out of the asynchronous FIFO 102A by bus 122 as quickly as the data words go in on bus 104, but according to local clock 48. Those skilled in the art will recognize that the local clock must be equal to or greater than the peak data word transfer rate of data over bus 104. By transferring data out of the bottom location of asynchronous FIFO 102A in step with the local clock, the synchronizer logic 102B synchronizes the data words to the local clock signals. Thus, synchronous data words are outputted from asynchronous FIFO 102A to synchronous FIFO 102C by bus 122 under control of synchronizer 102B. Since synchronizer 102B and synchronous FIFO 102C are both synchronous with respect to the local clock 48, no additional synchronization circuit is needed between them. Further, since the buffer memory interface 60 operates synchronously no additional synchronization circuit is needed there either. This means that the synchronous FIFO 102C can run at its maximum data transfer rate, which is the rate of the local clock 48.

Referring to FIGS. 3 and 4, synchronous FIFO 102C is 16 words deep to allow some time and rate buffering in case the DMA portion of the SCSI-DMA controller 54 cannot immediately access the external buffer memory 32. If the DMA portion of SCSI-DMA controller 54 has access to external buffer memory 32, then data is transferred between them at the local clock rate of the SCSI processor chip 30.

Because most of the buffering, i.e. sixteen words worth, is provided by the synchronous FIFO 102C, and the asynchronous FIFO is small, i.e. only three stages, this design is much less layout sensitive than the all asynchronous FIFO circuit known previously.

Thus, it will now be understood that there has been disclosed a bi-directional, data rate matching FIFO circuit that allows a high speed, asynchronous burst device to operate at its maximum data rate and yet match the data rate of a high speed synchronous device, such as a DMA at the other end of the FIFO. While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed as new and desired to be secured by Letters Patent of the United States is:

1. A circuit for matching data rates to transfer data between two asynchronous devices, comprising:

an asynchronous FIFO that has a first bi-directional data port, a second bi-directional data port, and a bi-directional control port;

a synchronous FIFO, that has a first bi-directional data port, a second bi-directional data port, and a bi-directional control port, said first bi-directional data port of said synchronous FIFO connected to said second bi-directional data port of said asynchronous FIFO; and a synchronizer, that has a first bi-directional control port and a second bi-directional control port, said first bi-directional control port of said synchronizer connected to said bi-directional control port of said asynchronous FIFO and said second bi-directional control port connected to said bi-directional control port of said synchronous FIFO;

wherein asynchronous data signals from one of said asynchronous devices are transferred between said first bi-directional data port of said asynchronous FIFO and said second bi-directional data port of said synchronous FIFO to the other of the asynchronous devices after a delay.

2. A circuit, as set forth in claim 1, further comprising: means for controlling said asynchronous FIFO connected to said asynchronous FIFO.

3. A circuit, as set forth in claim 2, further comprising: means for controlling said synchronous FIFO connected to said synchronous FIFO.

4. A circuit, as set forth in claim 3, wherein said asynchronous FIFO is of a fall through type having three stages with each stage having a storage capacity of one data word.

5. A circuit, as set forth in claim 1, further comprising: means for controlling said synchronous FIFO connected to said synchronous FIFO.

6. A circuit for matching data rates to transfer data between two asynchronous devices, comprising:

an asynchronous FIFO that has a data input, a data output, and a control output indicating that a data word is available for outputting;

a synchronizer, that has a control input and a control output, said control input connected to said asynchronous FIFO control output; and a synchronous FIFO, that has a data input, a control input and a data output, said synchronous FIFO control input connected to said synchronizer control output and said data input connected to said asynchronous FIFO data output;

wherein asynchronous data signals inputted on said asynchronous FIFO data input from one of the asynchronous devices are outputted to the other of the asynchronous devices at said synchronous FIFO data output after a propagation delay.

7. A circuit, as set forth in claim 6, further comprising: means for controlling said asynchronous FIFO connected to said asynchronous FIFO.

8. A circuit, as set forth in claim 7, further comprising: means for controlling said synchronous FIFO connected to said synchronous FIFO.

9. A circuit, as set forth in claim 6, further comprising: means for controlling said synchronous FIFO connected to said synchronous FIFO.

10. A circuit for matching data rates to transfer data between two asynchronous devices, comprising:

a synchronous FIFO, that has a data input, a data output and a control output, said control output indicating that said synchronous FIFO has a data word therein for transfer;

a synchronizer, that has a control input and a control output, said synchronizer control input connected to said synchronous FIFO control output; and an asynchronous FIFO, that has a data input, a control input, and a data output, said asynchronous FIFO data input connected to said synchronous FIFO data output and said asynchronous FIFO control input connected to said synchronizer control output;

wherein asynchronous data signals inputted on said synchronous FIFO data input from one of the asynchronous devices are outputted to the other of the asynchronous devices at said asynchronous FIFO output after a propagation delay.

11. A circuit, as set forth in claim 10, further comprising: means for controlling said asynchronous FIFO connected to said asynchronous FIFO.

12. A circuit, as set forth in claim 11, further comprising: means for controlling said synchronous FIFO connected to said synchronous FIFO.

13. A circuit, as set forth in claim 10, further comprising: means for controlling said synchronous FIFO connected to said synchronous FIFO.

14. A method of transferring data between two asynchronous devices comprising the steps of:

receiving data into an asynchronous FIFO from a first asynchronous device at a first rate;

signaling an intermediate synchronizer that received data is available for outputting from said asynchronous FIFO;

transferring said data into a synchronous FIFO under control of said intermediate synchronizer; and transmitting said data from said synchronous FIFO to a second asynchronous device.

15. The method as set forth in claim 14, wherein the step of transmitting said data from said synchronous FIFO to a second asynchronous device is at a second data rate.

16. The method as set forth in claim 15, further comprising the step of temporarily storing at least one word of data in said synchronous FIFO if said data rate is greater than said second data rate.

17. A circuit for matching data rates to transfer data between two asynchronous devices, comprising:

an asynchronous FIFO having a first bi-directional data port, a second data bi-directional port, and a bi-directional control port;

a synchronous FIFO having a first bi-directional port, a second bi-directional port, and a bi-directional control port, said first bi-directional data port of said synchronous FIFO coupled to said second bi-directional data port of said asynchronous FIFO; and a synchronizer having a first bi-directional control port and a second bi-directional control port, said first bi-directional control port of said synchronizer coupled to said bi-directional control port of said asynchronous FIFO and said second bi-directional control port coupled to said bi-directional control port of said synchronous FIFO.

18. A circuit for matching data rates to transfer data between two asynchronous devices, comprising:

a an asynchronous FIFO having a data input, a data output, and a control output indicating that a data word is available for outputting;

a synchronizer having a control input and a control output, said control input coupled to said asynchronous FIFO control output; and a synchronous FIFO having a data input, a control input and a data output, said synchronous FIFO control input coupled to said synchronizer control output and said data input coupled to said asynchronous FIFO data output.

19. A circuit for matching data rates to transfer data between two asynchronous devices, comprising:

a synchronous FIFO having a data input, a data output and a control output, said control output indicating that said synchronous FIFO has a data word therein for transfer;

a synchronizer having a control input and a control output, said synchronizer control input coupled to said synchronous FIFO control output; and an asynchronous FIFO having a data input, a control input, and a data output, said asynchronous FIFO data input coupled to said synchronous FIFO data output and said asynchronous FIFO control input coupled to said synchronizer control output.

\* \* \* \* \*